Figure 1:
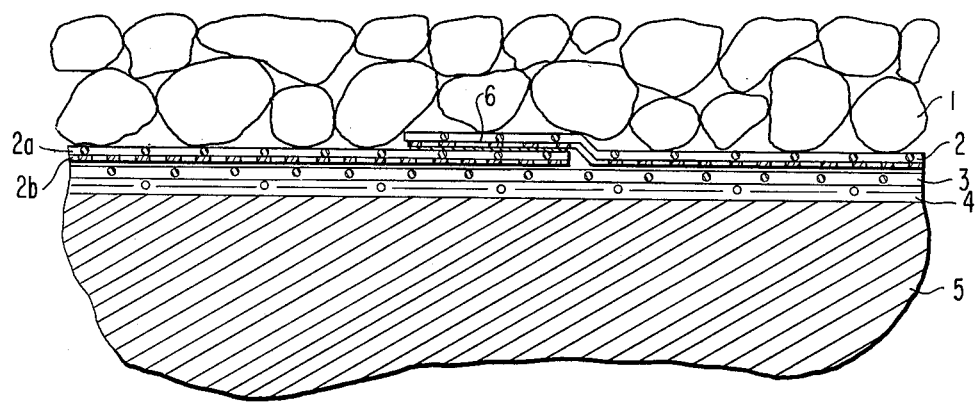

United States Patent [19]

Haage et al.

[11] 4,239,795
[45] * Dec. 16, 1980

[54] PROTECTIVE LAYER FOR SURFACE SEALS IN BUILDING CONSTRUCTION, UNDERGROUND CONSTRUCTION, AND CIVIL ENGINEERING CONSTRUCTION

[75] Inventors: Karl Haage, Troisdorf-Spich; Dieter Scharff, Troisdorf-Sieglar, both of Fed. Rep. of Germany

[73] Assignee: Dynamit Nobel Aktiengesellschaft, Fed. Rep. of Germany

[*] Notice: The portion of the term of this patent subsequent to Sep. 12, 1995, has been disclaimed.

[21] Appl. No.: 818,232

[22] Filed: Jul. 22, 1977

Related U.S. Application Data

[63] Continuation of Ser. No. 596,765, Jul. 17, 1975, abandoned.

[30] Foreign Application Priority Data

Jul. 17, 1974 [DE] Fed. Rep. of Germany ....... 2434328

[51] Int. Cl.² .................... B32B 5/04; E04B 1/66; B32B 27/12
[52] U.S. Cl. ..................... 428/247; 52/408; 52/746; 156/300; 156/322; 156/278; 428/257; 428/58; 428/290; 428/230; 428/321
[58] Field of Search .......... 428/247, 257, 268, 230, 428/231, 285, 290, 317, 321, 909, 260, 193; 156/71, 299, 300, 276, 298, 322; 52/408, 515, 612, 745, 746

[56] References Cited

U.S. PATENT DOCUMENTS

| | | | |
|---|---|---|---|
| 2,460,309 | 2/1949 | Rapp | 52/612 |
| 3,381,718 | 5/1968 | Darrow | 138/141 |
| 3,619,314 | 11/1971 | Ecureux | 156/71 |
| 3,660,200 | 5/1972 | Anderson et al. | 156/322 X |
| 3,733,239 | 5/1973 | George | 428/247 |
| 3,736,202 | 5/1973 | Sorenson | 156/322 X |
| 3,928,696 | 12/1975 | Wandel et al. | 428/255 X |
| 3,992,842 | 11/1976 | Haage et al. | 428/285 X |
| 4,113,907 | 9/1978 | Haage et al. | 428/193 X |

FOREIGN PATENT DOCUMENTS

| | | |
|---|---|---|
| 1264020 | 3/1968 | Fed. Rep. of Germany . |
| 1484012 | 12/1968 | Fed. Rep. of Germany . |
| 1659300 | 1/1971 | Fed. Rep. of Germany . |
| 7241739 | 11/1972 | Fed. Rep. of Germany . |
| 1410586 | 10/1964 | France . |
| 2032239 | 11/1970 | France . |
| 2206421 | 7/1974 | France . |
| 1195744 | 6/1970 | United Kingdom . |
| 1196384 | 6/1970 | United Kingdom . |
| 1212508 | 11/1970 | United Kingdom . |
| 1219501 | 1/1971 | United Kingdom . |
| 1266899 | 3/1972 | United Kingdom . |
| 1266900 | 3/1972 | United Kingdom . |
| 1314541 | 4/1973 | United Kingdom . |

OTHER PUBLICATIONS

"Polyvinyl", Modern Plastics Encyclopedia, 1973–1974, vol. 50, No. 10A, pp. 107 et seq.

Primary Examiner—George F. Lesmes
Assistant Examiner—E. Rollins Buffalow
Attorney, Agent, or Firm—Craig & Antonelli

[57] ABSTRACT

A protective covering for the protection of surface seals against mechanical damage in building constructions and other civil engineering constructions which comprises a composite of an elastic, waterproof thermoplastic synthetic resin film sheet and/or synthetic resin layer and a lattice-like fabric having knot couplings or points of intersection of the threads that yield under the effect of a load.

25 Claims, 2 Drawing Figures

U.S. Patent     Dec. 16, 1980     4,239,795

PROTECTIVE LAYER FOR SURFACE SEALS IN BUILDING CONSTRUCTION, UNDERGROUND CONSTRUCTION, AND CIVIL ENGINEERING CONSTRUCTION

This is a continuation of application Ser. No. 596,765, filed July 17, 1975, now abandoned.

This invention relates to a layer or covering that provides protection against mechanical damage for surface seals, which are preferably made of synthetic resin sheets, in the building, underground, and civil engineering construction fields.

When providing a surface layer seal against water under pressure or water seepage in the construction field with the aid of sheets of synthetic resin film or of a bituminous base, there is the danger that this sealing skin or layer is again damaged by subsequent layers and/or loads and/or work performed thereon. Consequently, coverings and/or protective layers have been employed to protect these seals against mechanical damage; such coverings have been made, for example, of foam sheets or solid panels.

However, difficulties are encountered, in this connection, if these coverings are to be attached along strongly inclined or vertical surfaces. It is also desirable for the protective layer to be waterproof, which is not ensured, for example, in case of the use of sheets of foam material. On the other hand, when using rigid panels there is the danger of dimensional changes due to temperature fluctuations, which can lead to cracking or splitting of the panels.

The present invention is based on the problem of providing a protective covering for surface seals that protects against mechanical damage which, on the one hand, is likewise waterproof and, on the other hand, shows sufficient resistance as a buffer layer to absorb mechanical stresses in the form of shocks or impacts or permanent stresses by sharp-edged materials. The protective layered covering of this invention is characterized by a composite consisting of an elastic, waterproof thermoplastic synthetic resin sheet or synthetic resin layer and of a lattice-like or net-like fabric wherein the knot junctions or points of intersections of the threads or fibers yield under the effect of a load.

The elastic, preferably tough-elastic topcoat of the protective layer formed of thermoplastic synthetic resin makes it possible to provide, in addition to the already present surface seal, a further waterproof layer which simultaneously can partially absorb mechanical loads due to its elasticity. The buffer layer of sufficient magnitude is obtained by the additional lattice fabric, for example of a fabric made from mineral fibers, such as glass fibers, either endless (i.e. continuous) or as staple fibers, or from a synthetic mesh of threads of polyester, polyamide, polyethylene, polypropylene, polycarbonate, or the like polymeric material. When using glass fabrics, e.g. spun glass fiber fabrics, pretreated cloths are utilized; the pretreatment consists partially of applying a silane finish and/or a nonslip treatment having a base of polyvinyl propionate and/or an aminosilane finish and/or an application of "Lutofan" and/or "Garon" finish. The finishing or final treatment can be effected in connection with the individual threads as well as for the fabric. In case of the fabric of this invention it is advantageous to employ both types of finishing simultaneously. The thread finishing step is a silane finishing process, wherein the binders can be either vinylsilanes, methacrylicsilanes, or aminosilanes or chromium-methacrylate complex salts. For the fabric finish process the finishing method is employed known under the trademark designation of "Lutofan" or "Garon" wherein, in the Lutofan process, soft PVC binder is employed ("Lutofan" is a trademark of Basf, German Federal Republic) and in the "Garon" process a vinylsilane is utilized, but the latter is only suitable for polyesters. The ratio of glass content to binder content in the pretreatment can vary; preferred are, however, glass content of the fabric of above 50% by weight, i.e. from 50% to 90% by weight. The binder contents can range between 50 and 10% by weight.

A sufficient buffer effect and protective effectiveness against mechanical damage is attained, according to the invention, only if the knot coupling of the fabric is minor, i.e. if a knot displacement can occur under the effect of stress and thus this stress is elastically absorbed. Suitable types of coupling or joining of the fibers in the fabric are provided by linen weave, gauze, and twill, or also nonwovens (wherein one layer or group of fibers is laid up in one direction and another layer or layers is laid cross-wise thereto) the latter for example in connection with synthetic fibers. In such nonwovens, the knot junction is established by welding (i.e. heat-bonding) or cementing, gluing or like bonding techniques.

Also the composite of the lattice-like fabric with the thermoplastic synthetic resin must be able to yield elastically under load, i.e. also between these two layers of the composite, an elastically yieldable connection is required in accordance with the present invention. Only in this way is the high mechanical protection effect of the protective layer ensured, and mechanical damage by loads which rest thereon, or by conducting subsequent work on the covered surface seal avoided even in case of a relatively minor thickness of the protective layer.

As the cover coat of the protective layer, a thermoplastic synthetic resin film sheet can be chosen which is bonded to the lattice fabric, for example, by laminating, cementing (gluing), or mechanical anchoring in the heated condition. The laminating step is carried out for example by heat-sealing, i.e. the film sheet is heated on one side up to the thermoplastic condition, and the fabric is pressed into the film sheet. The cementing step can be executed for example with the aid of a binding agent, e.g. a polyvinyl chloride-polyvinyl acetate copolymer, or with polyisocyanate compounds. However, advantageously, the cover coat is produced from a pasty basic mass of the thermoplastic synthetic resin by the spread-coating method with subsequent gelling. In a further development of the protective layer according to this invention, the provision is made to manufacture the synthetic resin layer forming the cover coat, i.e. the topcoat, from two layers of soft PVC of differing compositions. The topcoat can be constructed advantageously so that the upper topcoat layer has a higher weatherability, due to the addition of stabilizers, than the lower topcoat layer, and the latter has a higher proportion of fillers than the upper tocoat layer. Both measures serve for economical viewpoints, especially for saving expensive materials.

When using identical synthetic resins for the topcoat of the protective layer and/or for the surface seal, it is possible in a simple manner, according to a further development of the invention, to produce a positive connection between the protective layer and the surface seal to be protected by means of cementing or solution welding or bonding. It is possible, for example, to provide along the edges of the protective layer glued-on or welded-on strips made of the same or a similar material as the elastic topcoat, making it possible to attach the layer to the surface seal and/or to the substrate and/or to establish a waterproof connection of adjoining sheets or panels of the protective layer. Moreover, it is also possible to provide initially a zone free of fabric along the lateral marginal strips of the protective layer, which is used for the production of overlapping parts, etc.

A process for the production of a protective layer according to this invention, wherein the topcoat or layer is made of a synthetic resin in accordance with the spread-coating method, is carried out by applying the cover layer as a soft PVC plastisol to an endless carrier strip at room temperature; then placing the lattice fabric on this layer, which latter is still in the ungelled, i.e. liquid condition; then gelling the topcoat by heating in a temperature range of between 160° C. and 250° C., while simultaneously the bonding to the lattice fabric is taking place. The soft PVC plastisols, during heating, pass through various physical stages from the low-viscosity (liquid) product to the high viscosity (plastic) product, the intermediate stage being the gelled condition.

When producing a protective layer with a thermoplastic resin topcoat having a composition of different materials, i.e. with two topcoat layers, a soft PVC plastisol with a low filler content but with additives of stabilizers which especially increase the weatherability is applied to a carrier strip, e.g. a steel belt and gelling is initiated by a short-term heating to about 160°–200° C., whereupon the second topcoat layer of soft PVC with a high filler content, e.g. chalk, is applied at room temperature; the lattice fabric is laid thereon, and the composite is thereafter finally gelled by heating in a temperature range of between 160° C. and 250° C. while simultaneously establishing the adhesive bonding to the lattice fabric.

This process makes it possible to effect a continuous, economical manufacture of the protective layer of this invention.

The invention is explained in the drawings, using the sealing of terrace structures as a preferred embodiment. However, the invention is not limited to this embodiment but rather is usable in the entire building sector in connection with any sealing problems.

Figure 2:
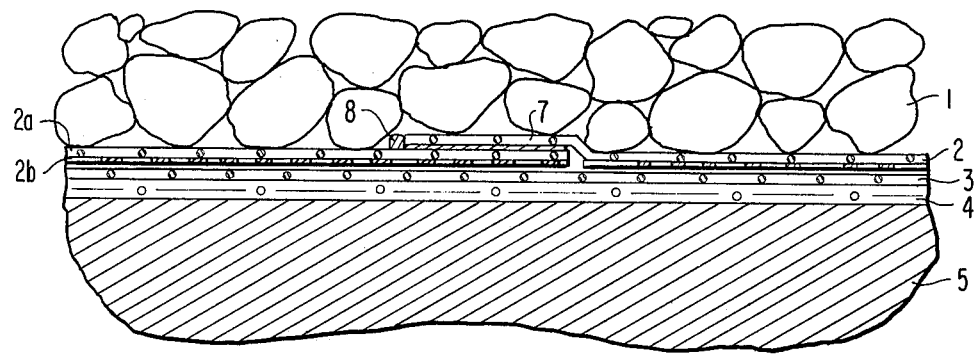

In the drawings:

FIG. 1 shows a protective layer with a fabric in the marginal zone in the form of an overlapping seam; and FIG. 2 shows a protective layer with a fabric-free edge in the junction zone.

In the terrace sealing system according to FIG. 1, an intermediate layer 4, e.g. a synthetic resin film sheet is applied on top of the load-bearing construction 5, for example masonry, a concrete layer, etc. optionally after providing an undercoating and/or a cleaning layer. Over this material is placed the waterproof surface seal in the form of the sealing skin 3, for example a soft PVC sheet which is applied in panels and solution-welded together along the edges. "Solution-welding" is a cold welding process wherein a solvent, e.g. tetrahydrofuran for PVC is employed. To protect this sealing skin 3 against mechanical damage by subsequent work or loads, which in the illustrated embodiment is the gravel load 1, the protective layer 2 is placed thereon. The protective layer of this invention consists of a composite of the waterproof topcoat 2a, e.g. a soft PVC film, and the lattice-like fabric 2b, for example a spun glass fabric. The composite is produced, for example, by lamination. Along the junction zone of two abutting panels of the protective layer, a water proof connection is established by an overlapping seam. In the illustrated embodiment according to FIG. 1, the lattice-like fabric 2b of the protective layer is positioned so that it extends up to the periphery or edge of the protective layer. Yet is is possible to obtain, by superimposing the edges, a flawless connection which has adhesive strength and is waterproof, for example by solution welding in the overlapping zone 6, since the seam connection is established through the lattice-like fabric, respectively, in the region between the lattice like-fabric, joining the two topcoats 2a of thermoplastic synthetic resin together.

In a modification of the embodiment shown in FIG. 1, a marginal strip 7 of the topcoat without a lattice-like fabric is formed on one side of one of the protective layers. This modification is shown in FIG. 2. Here again, an overlapping seam can be fashioned, for example, by solution welding with adhesive strength and waterproofing action in a simple manner. Additionally, it is necessary to secure the edges by means of "liquid film" such as soft PVC dissolved in a solvent, like tetrahydrofuran, denoted by reference numeral 8. In cases where also a positive connection is desired between the protective layer 2 and the sealing sheet 3 lying therebeneath, this can be accomplished optionally by solution welding, cementing, or some other suitable type of bonding. This is so, because in each case a connection can be established through openings provided in the lattice-like bottom layer 2b of the protective layer 2 with the thermoplastic topcoat 2a, for example soft PVC.

However, it is just as well possible to produce the seam connection between abutting sheets of protective layers by means of joint strips bridging the butt joint. With the use of a topcoat 2a for the protective layer 2 of soft PVC and a corresponding soft PVC sheet for the joint strip, the adhesive and positive connection can be effected by solution welding. Also in such a bond, the lateral margins of the joint strip can additionally be sealed by means of a "liquid film" such as soft PVC dissolved in a solvent.

As can be seen from the illustrated embodiments, it is possible to produce, in addition to the already provided waterproof surface seal 3, a further waterproof layer by means of the topcoat 2a of the protective layer 2 of this invention. It is also feasible to attach joint strips already previously along an edge of the protective layers. The same purpose is likewise achieved by setting back the lattice-like fabric layer 2b of the protective layer 2 from the marginal edges of the sheets of the protective layer, so that initially edges of the protective layer are provided which are free of lattice-like fabric. Also the provision of transverse joint strips, which extend from the top toward the bottom, and other known types of joining are usable in a particularly advantageous fashion in the protective layer of this invention.

The following is an example for constructing a protective layer in accordance with the present invention:

The topcoat of the protective layer consists of a first topcoat layer having a thickness of 0.3 mm. and made of soft PVC, which is stable with respect to UV and weathering; the proportion of plasticizer, can be between 30 and 50% by weight, based on the PVC-plasticizer mixture, while the low filler content is about 5% by weight, based on the total weight of PVC, plasticizer, and filler. Suitable plasticizers are, for example, all straight-chain and/or branched phthalic acid esters. Suitable ultraviolet stabilizers are benzotriazole derivatives and/or benzophenone in the amount of 0.1–0.5% by weight based on the weight of the PVC employed. Heat stabilizers can be barium-cadmium-zinc complexes in an amount of 0.5–2% by weight based on the weight of the PVC utilized. The second topcoat layer having a thickness of 0.5 mm. consists of a highly filled soft PVC layer wherein the plasticizer proportion is likewise between 30 and 50% by weight, based on the PVC-plasticizer mixture, while the filler content is between 50 and 60% by weight, based on the PVC-plasticizer-filler mixture. No stabilizers against UV and weathering are provided, since this inner topcoat layer is not exposed to the outside atmosphere. A suitable filler is chalk, for example. The lattice-like fabric is a wide-mesh spun glass fabric of E-glass fibers having the following values:

Weight per unit area 40–150 g. per m$^2$; thread density 2–12 g. per cm; thickness according to DIN 53 855 0.1–0.7 mm., wherein the thickness of the laminate represents a glass content of 62%, while the residual 38% consists of binder, i.e. soft PVC used by the Lutofan method; the strength of the material ranges between 340 and 2,720 dtex (a decitex is the weight of fiber in grams peer 10 km. of yarn); the types of coupling junctions holding the threads together is provided by a linen weave; the pretreatment of the fabric yielding the binder or adhesive bridge for the glass fibers consists in silanizing, i.e. coated with a vinylsilane.

The total thickness of the protective layer is about 1 mm.

In the illustrated examples, the protective layer of this invention is utilized in the production of terrace seals. In this connection, the sealing skin can be injured during subsequent work, due to fractured gravel stones, sharp-edged boards or board fragments. This is avoided by employing the protective layer of this invention. This layer is placed on the sealing skin before the subsequent work begins and is joined together along the abutting joints and, optionally, also joined with the sealing skin.

Moreover, all other fields of application in building construction, underground construction, and civil engineering construction wherein surface seals are required are suitable for the use of the protective layer of this invention. The layer of the present invention avoids the danger of mechanical damage to the surface seal, since it forms a buffer layer for absorbing the mechanical attacks in the form of shock, impacts, long-term stress by sharp-edged material, etc. This buffer layer is essentially constituted by the resilient, lattice-like fabric and by the yielding coupling between the fabric and the topcoat, while the additional seal is formed by a tough-elastic topcoat of the protective layer which simultaneously has the ability to absorb mechanical stresses or loads. Moreover, the tough-elastic topcoat of a synthetic resin offers the possibility of being bonded in a waterproof and positive manner to the substrate, to the surface seal and/or to the identical topcoat of the adjoining sheet along the butt joints, optionally with the aid of strips, by means of cementing or solution welding.

What is claimed is:

1. A protective covering for the protection of surface seals against mechanical damage due to a load or impact of a sharp-edged material in building construction, underground construction, and civil engineering construction, said covering comprising a composite of an elastic, tough, waterproof thermoplastic synthetic resin topcoat bonded to a resilient lattice-like fabric having fibers joined together at junctions that yield under the effect of a load, said topcoat consisting of two layers of thermoplastic synthetic resin having differing compositions, an upper topcoat layer having a higher weatherability due to the addition of stabilizers and a lower filler content as compared to a lower topcoat layer.

2. The protective covering according to claim 1, wherein the lattice-like fabric consists of mineral fibers.

3. The protective covering according to claim 1, wherein the lattice-like fabric consists of glass fibers.

4. The protective covering according to claim 1, wherein the lattice-like fabric consists of a network of synthetic threads joined together at said junctions, said threads comprising fibers of a synthetic resin selected from the group consisting of polyester, polyamide, polyethylene, polypropylene, and polycarbonate.

5. A protective covering according to claim 1 said composite also having zones of said topcoat that are free of fabric along lateral marginal strip-shaped areas of said composite.

6. The protective covering according to claim 1, further comprising thermoplastic strips at the edges of the composite, for attaching the composite to a surface seal and for establishing a waterproof connection between mutually adjoining composite sheets of the protective covering.

7. The protective covering according to claim 1, wherein the junctions within the fabric are located at the points of intersection of the fibers forming the fabric, said fabric comprising a linen weave construction.

8. The protective covering according to claim 1, wherein the lattice-like fabric is provided by a nonwoven material, wherein one layer of fibers is laid-up in one direction and another layer is laid-up crosswise thereto, said junctions being established by bonding said layers of fibers together.

9. The protective covering according to claim 1, wherein the two layers forming the topcoat are made of soft polyvinyl chloride.

10. The protective covering according to claim 9, wherein the soft polyvinyl chloride layers are gelled layers of a plastisol of polyvinyl chloride.

11. The protective covering according to claim 1, wherein the junctions within the fabric are located at the points of intersection of the fibers forming the fabric, said fabric comprising a gauze construction.

12. The protective covering according to claim 1, wherein the junctions within the fabric are located at the points of intersection of the fibers forming the fabric, said fabric comprising a twill construction.

13. The protective covering according to claim 1, wherein said covering consists of said thermoplastic synthetic resin top-coat bonded to one side of said resilient lattic-like fabric.

14. A terrace construction which comprises a load-bearing substrate, at least one thermoplastic film sheet overlying said load-bearing substrate, a protective covering comprising a composite of an elastic, tough, waterproof thermoplastic synthetic resin topcoat bonded to a resilient lattice-like fabric having fibers joined together at junctions that yield under the effect of a load, said top-coat consisting of two layers of thermoplastic synthetic resin having differing compositions, an upper top-coat layer having a higher weatherability due to the addition of stabilizers and a lower filler content as compared to a lower top-coat layer, and a gravel load placed on said protective covering.

15. The terrace construction of claim 14, wherein the lattice-like fabric consists of a network of synthetic threads joined together at said junctions, said threads comprising fibers of a synthetic resin selected from the group consisting of polyester, polyamide, polyethylene, polypropylene and polycarbonate.

16. A terrace construction according to claim 14, wherein said composite also has zones of said top-coat that are free of fabric along lateral marginal strip-shaped areas of said composite.

17. A terrace construction according to claim 14, further comprising thermoplastic strips at the edges of the composite, for attaching the composite to a surface seal and for establishing a waterproof connection between mutually adjoining composite sheets of the protective covering.

18. A terrace construction according to claim 14, wherein said at least one synthetic resin sheet overlying said load-bearing construction comprises a surface sealing skin formed of soft PVC sheet material and the load-bearing substrate comprises a masonry construction.

19. A terrace construction according to claim 14, wherein the junctions within the fabric are located at the points of intersection of the fibers forming the fabric, said fabric comprising a linen weave construction.

20. A terrace construction according to claim 14, wherein the lattice-like fabric is provided by nonwoven material, wherein one layer of fibers is laid-up in one direction and another layer is laid-up cross-wise thereto, said junctions being established by bonding said layers of fibers together.

21. A terrace construction according to claim 14, wherein the resin in the two layers forming the top-coat is soft polyvinyl chloride.

22. A terrace construction according to claim 21, wherein the soft polyvinyl chloride layers are formed of a plastisol of polyvinyl chloride.

23. A terrace construction according to claim 14, wherein the junctions within the fabric are located at the points of intersection of the fibers forming the fabric, said fabric comprising a gauze construction.

24. A terrace construction according to claim 14, wherein the junctions within the fabric are located at the points of intersection of the fibers forming the fabric, said fabric comprising a twill construction.

25. The terrace construction according to claim 14, wherein said protective covering consists of said synthetic resin top-coat bonded to one side of said resilient lattice-like fabric.

* * * * *